Feb. 19, 1952        J. G. DWYER        2,586,313
GAS TESTING INSTRUMENT
Filed Oct. 27, 1947        2 SHEETS—SHEET 1
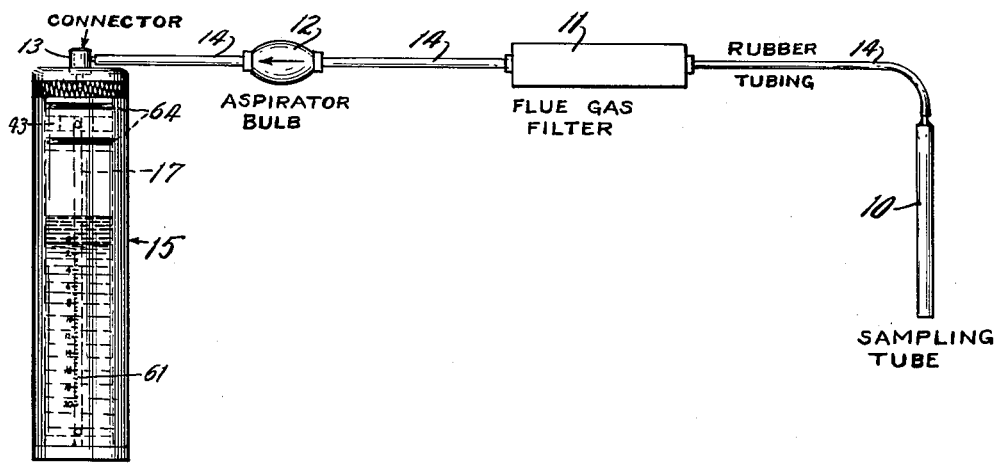
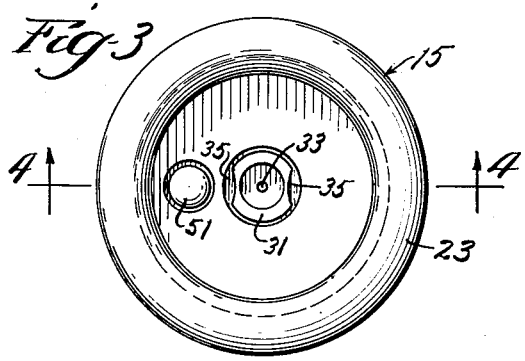
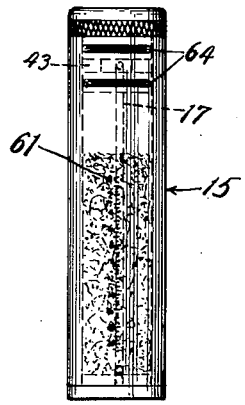
Inventor
James G. Dwyer
By: Mann and Brown
Attys.

Feb. 19, 1952     J. G. DWYER     2,586,313
GAS TESTING INSTRUMENT
Filed Oct. 27, 1947     2 SHEETS—SHEET 2
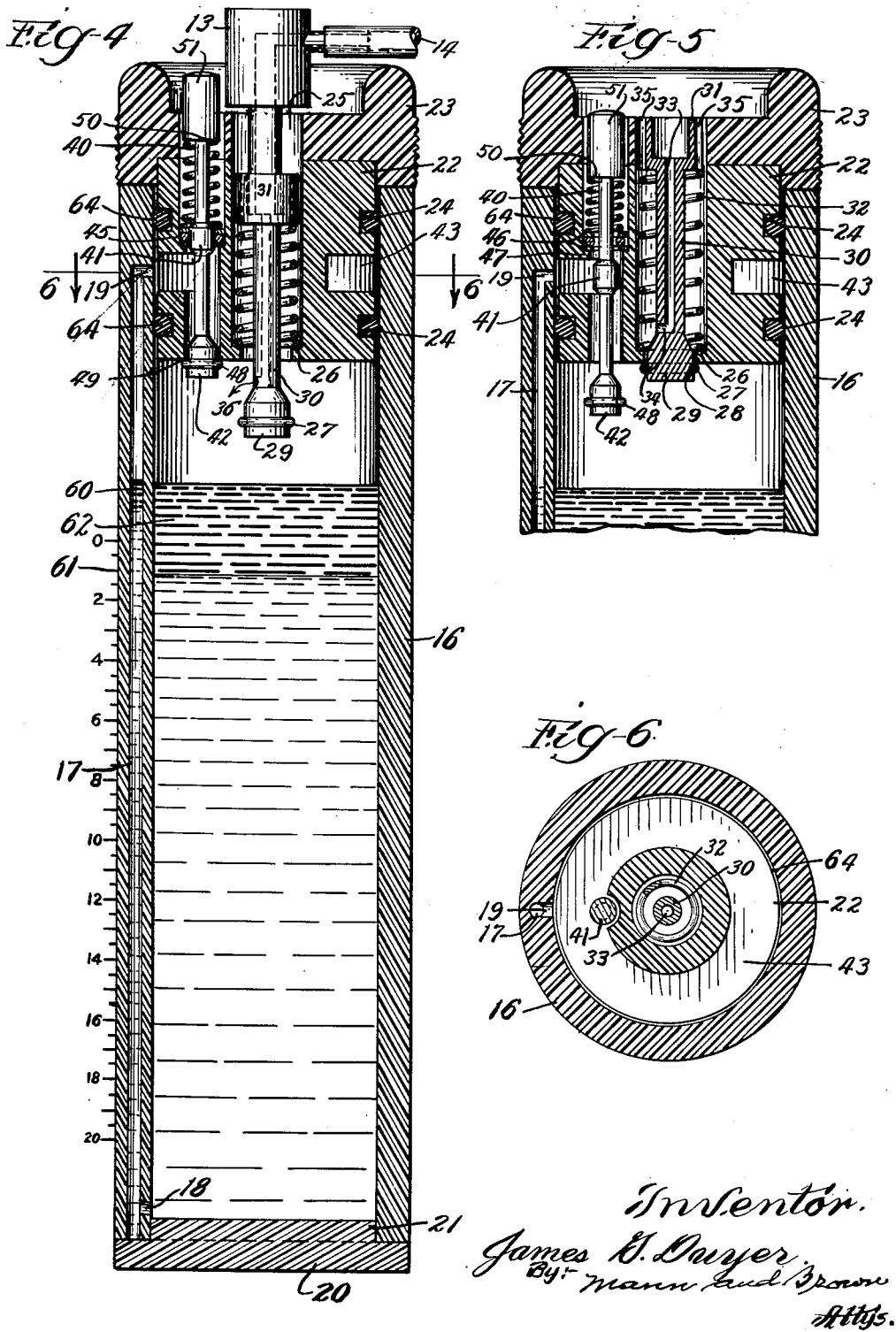
Inventor.
James G. Dwyer,
By Mann and Brown
Attys.

Patented Feb. 19, 1952

2,586,313

UNITED STATES PATENT OFFICE 2,586,313

GAS TESTING INSTRUMENT

James G. Dwyer, Deerfield, Ill., assignor to F. W. Dwyer Mfg. Co., a corporation of Illinois Application October 27, 1947, Serial No. 782,329

5 Claims. (Cl. 23—254)

This invention relates to a testing instrument and procedure particularly suitable to quickly indicate the percentage of carbon dioxide in products of combustion and such like.

The general scheme of operation, as disclosed in the patent to Dwyer No. 2,357,638, September 5, 1944, is to subject a quantity of flue gas in a closed chamber to a reagent that combines with carbon dioxide and then indicate the quantity so combined by the change in pressure in the chamber.

Generally speaking, this is accomplished in the present instance by means of a U-tube having a large reaction arm and a small indicator arm equipped with suitable valve means for controlling the charging of gas to be tested and for admitting atmospheric pressure to or excluding it from the system as the procedure requires. The reagent, such as a solution of caustic soda (NaOH) or potash (KOH), fills the U-tube to a selected level and is made ineffective by a layer or blanket of oil, such as kerosene or a light mineral oil, until the appropriate time when the gas and reagent are quickly and intimately mixed by shaking the instrument.

The principal object is to simplify the instrument and the test procedure.

In the drawings—

Fig. 1 is a diagrammatic illustration of an assembly including the instrument ready for making a test;

Fig. 2 is a side elevation of the instrument;

Fig. 3 is an enlarged plan view of the same;

Fig. 4 is an enlarged vertical section taken on the line 4—4 of Fig. 3 and showing the charging valve in position to admit a flow of gas through the reaction chamber above the liquid;

Fig. 5 is a similar view of the upper portion of the instrument with the charging valve closed and the vent valve open to bring the two arms of the U-tube to atmospheric pressure; and Fig. 6 is a transverse section taken on the line 6—6 of Fig. 4.

The assembly shown in Fig. 1 includes a sampling tube 10, a flue gas filter 11, an aspirator bulb 12, and a gas connector 13 connected in series by rubber tubing 14 and associated with the preferred form of instrument embodying the present invention as indicated generally at 15.

In this simple form, the large reaction arm of the U-tube is a tall, hollow cylinder 16, and the small indicator arm is a slender bore 17 extending along through the wall of the cylinder and connected with the large reaction arm below at 18 and above at 19.

At the lower end, the cylinder 16 is closed by a bottom 20, in this form having a cylindrical portion 21 inserted into the lower end of the cylinder and made fast to it by suitable means.

At the upper end, the cylinder 16 is fitted with a closure head including a piston 22 and a cap 23—for convenience in this illustration shown as separate pieces, but actually secured together to function as one.

In order to make this closure gas-tight in use but readily removable and replaceable, the piston is provided with spaced grooves 24 fitted with rubber rings 64 on the order of those disclosed in the patent to Christensen No. 2,180,795, November 21, 1939.

The closure cap has a central, longitudinal charging passage 25 extending through it except for a ring or flange 26 at the bottom, which serves as a valve seat to cooperate with a round ring gasket 27 fitted in a groove 28 in the head 29 of the valve, provided with a hollow stem 30 and a valve button 31. The valve is normally urged toward seated position by a spring 32 compressed between the flange 26 and the button 31. The gas inlet passage 33 in the hollow stem delivers laterally at the bottom 34, and the button is cut away at opposite sides indicated by 35, to the end that when the charging valve is in the position shown in Fig. 4 the gas will be delivered laterally into the reaction chamber, as indicated by the arrow 36, and after circulating in the chamber will pass upwardly about the valve and through the cut-away portions 35. In this way, the gas to be tested may be passed through the reaction chamber of the instrument until all of the air has been removed, when a suitable charge will be trapped by allowing the valve to close.

The connector 13 is shown in Fig. 4 as being used to depress the valve to open position.

The closure head also has a laterally disposed passage 40 parallel to the charging passage and equipped with two valve heads 41 and 42. The equalizing passage 40 traverses a groove 43 in the piston 22 between the ring grooves 24 and maintaining communication with the upper end of the small indicator arm of the U-tube.

Above the groove 43 is a rubber ring valve packing 45 cooperating with the valve head 41 to close the passage when the parts are in the position shown in Fig. 4. The rubber ring is held in place by a metal ring 46 and a flange 47, to the end that the head 41 may fit into it, as shown in Fig. 4, for closed position, or pass clear of it, as shown in Fig. 5, for open position.

The valve head 42 is provided with a rubber gasket 48 fitted in a groove in the head and cooperating with the valve seat 49 at the bottom of the passage 40 to cut off communication between that passage and the reaction chamber at the upper end of the large arm of the U-tube.

The vent valve is urged to closed position, shown in Fig. 4, by a spring 50 compressed between a button 51 and the ring 46. The rubber gasket 45 has an internal diameter somewhat less than the piston head 41, whereby the opening movement first moves the head 41 through the gasket against friction, and whereby the passage is effectively closed on the return movement before the valve head 42 is seated.

Operation

In operation, the apparatus is assembled as shown in Fig. 1. Pressure on the button 51 will then open the vent passage to bring both arms of the U-tube to atmospheric pressure; and by tilting the instrument, the upper level 60 of the liquid in the small indicator arm may be brought to a datum line, such as zero, on a scale 61, secured to or engraved upon the cylinder 16 alongside the small indicator arm. Button 51 is then released and the instrument may be righted. If the quantity of reagent originally placed in the instrument brought the original liquid level to approximately the datum line, the foregoing setting of the liquid level to the datum line will be maintained after button 51 is released and the instrument righted with sufficient accuracy for the purposes of most tests made of the carbon-dioxide content of combustion gases. Pressing the connector 13 down to open the charging valve, as shown in Fig. 4, and working the aspirator will charge gas through the charging passage into the reaction chamber and out again until the air is exhausted and the chamber filled with gas to be tested, when raising the connector 13 will permit the charging valve to close. Then, by vigorously shaking the instrument in a more or less up and down fashion, the gas is quickly brought into intimate contact with the reagent below the blanket of kerosene or the like 62. The reagent will quickly combine with the carbon dioxide, reducing the pressure in the reaction chamber at the upper end of the large reaction arm, whereupon the pressure in the upper end of the indicator arm will force the level of the liquid downwardly and indicate on the scale the quantity of carbon dioxide that has been combined with the reagent. The scale being properly calibrated, that quantity can be read off in percentages or other units, as may be desired.

The cylinder 16 is most conveniently made of transparent material, and preferably methyl methacryate made by E. I. du Pont de Nemours & Co., Inc., and sold under the trade name "Lucite."

The cylinder can be made of tubing, or cast or bored from a block of bar stock. The bottom 20 may be made fast with a suitable cement or by a solvent applied to the adjacent surfaces of the bottom of the cylinder followed by the application of pressure.

An instrument that has been found eminently satisfactory in practice has a 2" outside diameter with a ¼" wall and a ⅛" bore for the indicator arm. The inside bore is reamed out at the top plus or minus .002", and the piston 22 of the closure has a clearance of about 10 to 15 thousandths. The sealing rings are about ⅛" in diameter and are of a size to provide a squeeze on the order of .004".

While the instrument and procedure here disclosed are particularly suited to tests for carbon dioxide, they will be readily applied to other uses, either as shown and described or with suitable modification.

I claim:

1. In a gas testing instrument, a body member having a relatively large-diameter cylindrical bore, and a relatively small-diameter cylindrical bore connected adjacent their lower ends to form the large and small arms respectively of a manometer tube adapted to contain a liquid reagent, a cap tightly fitting the body member and sealing the upper ends of both arms from the atmosphere, said cap having a first passage interconnecting the top portions of said arms and a second passage placing said upper ends of the arms in communication with the atmosphere, and valve means located in said first and second passages and adapted to selectively place the upper ends of both arms in communication with the atmosphere or seal said ends of the arms from the atmosphere, said cap also having a valved gas inlet passage leading to the interior of said body member.

2. The gas testing instrument as set forth in claim 1 in which the valve means includes a valve seat in each of said passageways, a valve member cooperating with each such seat, and a valve stem operatively connected to said valve members for seating and unseating said valve members from their respective seats.

3. The gas testing instrument as set forth in claim 1 in which the valve means including valve seats in longitudinal alignment, a valve member cooperating with each such seat, and a valve stem operatively connecting the valve members for moving said valve members to and from seated position.

4. The gas testing instrument as set forth in claim 1 in which the body member is a hollow cylinder enclosed at the bottom and having a longitudinal bore through the side wall thereof whereby the cylinder itself constitutes the large arm of a manometer and the small bore in the side wall constitutes the small arm of the manometer.

5. The gas test instrument as set forth in claim 1 in which the cap has a third passageway communicating at one end with the upper end of the large bore and at the other end with the exterior of the cap, and a valve in said third passageway for controlling the admission of the gas being tested to the large arm of the manometer.

JAMES G. DWYER.

REFERENCES CITED

The following references are of record in the file of this patent:

UNITED STATES PATENTS

| Number | Name | Date |
|---|---|---|
| 1,223,953 | Frisak | Apr. 24, 1917 |
| 1,282,409 | Gilbert | Oct. 22, 1918 |
| 1,858,399 | Jones | May 17, 1932 |
| 2,047,407 | Dwyer et al. | July 14, 1936 |
| 2,180,795 | Christensen | Nov. 21, 1939 |
| 2,181,013 | Dwyer | Nov. 21, 1939 |
| 2,357,638 | Dwyer | Sept. 5, 1944 |

FOREIGN PATENTS

| Number | Country | Date |
|---|---|---|
| 272,092 | Great Britain | June 9, 1927 |
| 433,979 | Great Britain | Aug. 23, 1935 |
| 391,556 | France | Sept. 1, 1908 |